(12) United States Patent
Wozniak et al.

(10) Patent No.: US 6,418,962 B1
(45) Date of Patent: Jul. 16, 2002

(54) LOW COST, COMPRESSED GAS FUEL STORAGE SYSTEM

(75) Inventors: John J. Wozniak, Columbia; Paul D. Wienhold, Baltimore, both of MD (US); Dale B. Tiller, Lincoln, NE (US)

(73) Assignee: The Johns Hopkins University, Baltimore, MD (US)

(*) Notice: Subject to any disclaimer, the term of this patent is extended or adjusted under 35 U.S.C. 154(b) by 0 days.

(21) Appl. No.: 09/427,781

(22) Filed: Oct. 27, 1999

Related U.S. Application Data
(60) Provisional application No. 60/105,889, filed on Oct. 27, 1998.

(51) Int. Cl.$^7$ .............................. B65D 8/00; B67D 5/04
(52) U.S. Cl. ..................... 137/266; 137/377; 220/23.2; 220/581; 220/586
(58) Field of Search ................................. 137/266, 376, 137/377; 220/23.2, 581, 584, 585, 23.88, 23.89, 4.24, 562, 564

(56) References Cited

U.S. PATENT DOCUMENTS

| | | | |
|---|---|---|---|
| 4,405,161 A | * 9/1983 | Young et al. ................. 285/80 |
| 4,416,227 A | 11/1983 | Imamura | |
| 4,827,969 A | * 5/1989 | Lyasko ....................... 137/382 |
| 4,978,148 A | 12/1990 | Kosugi et al. | |
| 5,042,520 A | * 8/1991 | Reznik ........................ 137/79 |
| 5,211,685 A | * 5/1993 | Garcia ...................... 137/295 |
| 5,284,267 A | * 2/1994 | Polletta .................... 220/581 X |
| 5,577,630 A | * 11/1996 | Blair et al. ................. 220/581 |
| 5,603,360 A | 2/1997 | Teel | |
| 5,632,250 A | 5/1997 | Kato et al. | |
| 5,676,180 A | 10/1997 | Teel | |
| 5,704,387 A | 1/1998 | Sims | |
| 5,813,429 A | * 9/1998 | Ohtaka et al. .............. 137/266 |

OTHER PUBLICATIONS

DOT —"Federal Motor Vehicle Safety Standards; Fuel System Integrity of Compressed Natural Gas Vehicles; Compressed Natural Gas Fuel Container Integrity"—Dec. 19, 1994.
DOT —"Federal Motor Vehicle Safety Standards; Compressed Natural Gas Fuel Container Integrity"—Dec. 28, 1994.
DOT —"Federal Motor Vehicle Safety Standards; Fuel System Integrity of Compressed Natural Gas Vehicles"—Apr. 25, 1994.
Dept. of Energy —Advanced Automotive Technologies Annual Report to Congress —Fiscal Year 1996 (Mar. 1998).
ICNGI/Lincoln Composites —ISS —Novel Compressed Natural Gas Storage System for Automotive Applications approx. Jan. 22, 1999.

(List continued on next page.)

*Primary Examiner*—John Rivell
(74) *Attorney, Agent, or Firm*—Francis A. Cooch

(57) ABSTRACT

A compressed gas vehicle fuel storage system comprised of a plurality of compressed gas pressure cells supported by shock-absorbing bumpers positioned within a low cost, shape-conforming container. The container is dimensioned relative to the compressed gas pressure cells whereby a radial air gap surrounds each compressed gas pressure cell. The radial air gap allows pressure-induced expansion of the pressure cells without resulting in the application of pressure to adjacent pressure cells or physical pressure to the container. The pressure cells are interconnected by a gas control assembly including a thermally activated pressure relief device, a manual safety shut-off valve, and means for connecting the fuel storage system to a vehicle power source and a refueling adapter. The gas control assembly is enclosed by a protective cover attached to the container. The system is attached to the vehicle with straps to enable the chassis to deform as intended in a high-speed collision.

10 Claims, 8 Drawing Sheets

OTHER PUBLICATIONS

Lincoln Composites —NGV Fuel Tank Inspection Guidelines —1994/1996.

NFPA 52 —Compressed Natural Gas (CNG) Vehicular Fuel Systems 1992 Edition.

Compressed Gas Association, Inc. —Pressure Relief Device Standards Part 1 —Cylinders For Compressed Gas CGA S–1.1 —1994.

Proposed Revision To American National Standard For Basic Requirements For Compressed Natural Gas Vehicle (NGV) Fuel Containers —Mar. 1, 1995.

Basic Requirements For Compressed Natural Gas Vehicle (NGV) Fuel Containers —ANSI/AGA —NGV2–1992.

EnV'98 Alternative Fuel Vehicles Advanced Natural Gas Vehicle Project —Johns Hopkins University, J.J. Wozniak et al. EnV'98 Environmental Vehicles & Alternative Fuels Conf., Jun. 15–17, 1998, Ypsilanta, MI.

Advanced Natural Gas Vehicle Development —Johns Hopkins University, J.J. Wozniak et al., vol. 16 No. 1 (1995).

The Application of Scrimp Vartm Fabrication Technology to the Compressed Natural Gas Integrated Storage System Wienhold J P. et al., sampe J., 34(1) (Jan./Feb. 1998).

Development of an Integrated Storage System for a Mid–Size Automobile, Johns Hopkins University, Dale Tiller et al., May 26–28, 1998 Cologne, Germany.

Advanced Natural Gas Vehicle Program Johns Hopkins University, J. Wozniak et al. (1997).

* cited by examiner

Gas cylinders mounted within trunk

ISS mounted under trunk floor pan

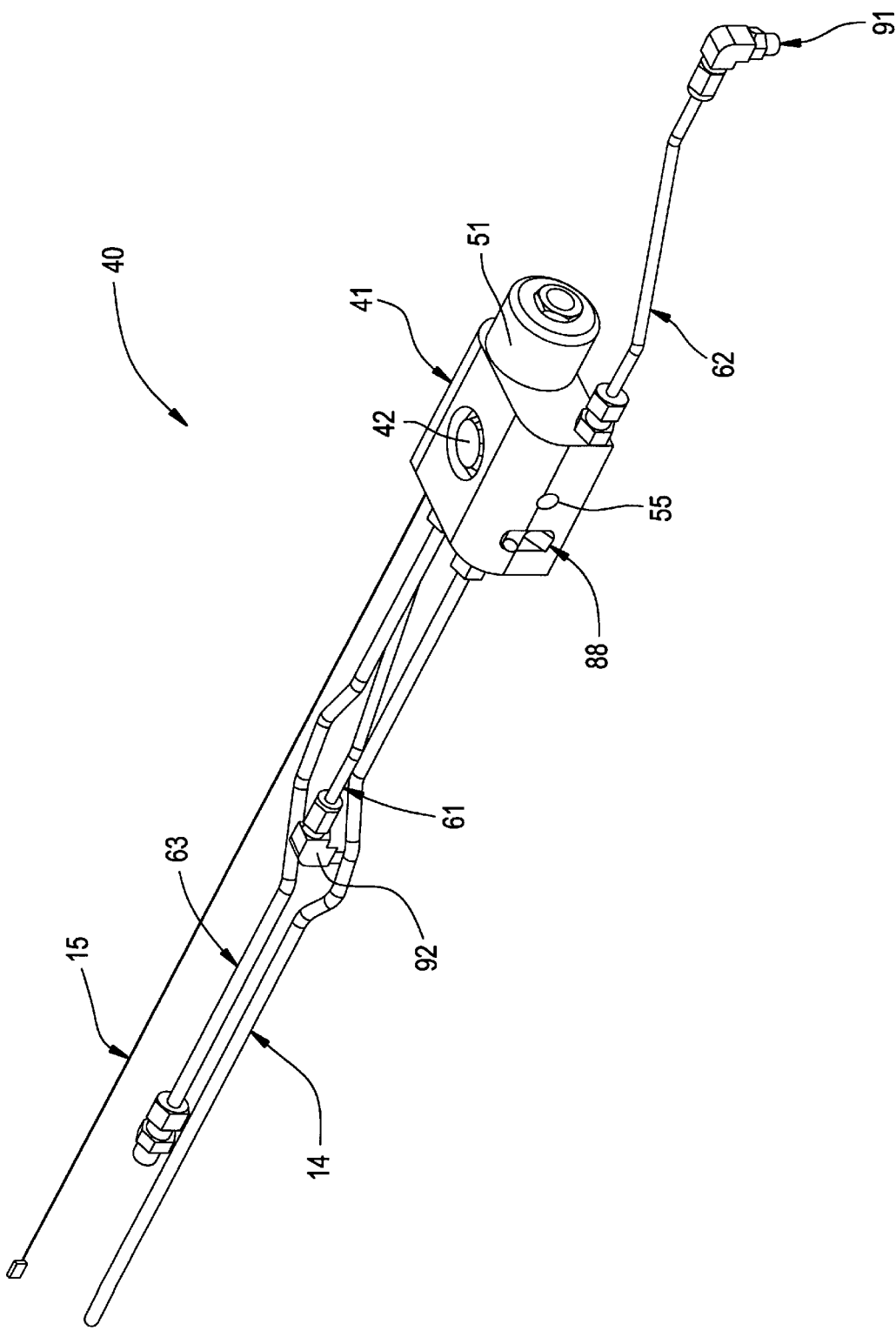

LOW COST, COMPRESSED GAS FUEL STORAGE SYSTEM

CROSS-REFERENCE TO RELATED APPLICATION

This application claims the benefit of prior filed U.S. provisional application Ser. No. 60/105,889, filed Oct. 27, 1998.

BACKGROUND OF THE INVENTION

1. Field of the Invention

The present invention relates to an integrated compressed gas fuel storage system for motor vehicles, called the Integrated Storage System (ISS), comprising a plurality of high pressure gas storage cylinders (hereinafter referred to as pressure cells), interconnected by a gas control assembly incorporating operational and safety controls all contained within a molded housing.

2. Background

Domestic oil production is declining due to U.S. oil reserves becoming more difficult to tap while demands on petroleum production escalate. Half of the U.S. oil supply is imported and the U.S. Department of Energy predicts a 60 percent deficiency by the year 2010. International oil companies relying on easily extracted foreign oil may meet the demand but at an unacceptable cost to the U.S. economy. The primary cause of the short fall is the motor vehicle. Current predictions indicate motor vehicles will proliferate globally from 500 million today to one billion by the year 2030. The solution is obvious, alternative fuels must be developed for motor vehicles.

It has been demonstrated that compressed gasses such as hydrogen, propane, methane or natural gas are viable alternatives to petroleum as a fuel source for motor vehicles. Natural gas is one of the more interesting of the alternatives because it is a plentiful commodity in the United States and therefor inexpensive. As a result, more than 30,000 natural gas vehicles are currently in use in the United States. These vehicles have demonstrated low fuel costs and reduced engine maintenance while affording a significant reduction in exhaust emissions. Such vehicles have been restricted to fleet trucks, delivery vans, buses and taxis due to their limited range. The restrictions and limitations are caused by the space required for existing compressed gas fuel systems. This space penalty results in lost truck bed volume, automobile trunk volume and range. Furthermore, higher initial purchase prices are experienced due to the cost of the gas storage systems.

Compressed gas vehicle fuel systems traditionally consist of a single large cylinder or a series of smaller cylinders mechanically clamped together and rigidly mounted to the vehicle chassis. Numerous clamps, brackets, and redundant valves and safety devices are required to comply with federal law. Installation and maintenance costs are high.

An example of a contemporary compressed natural gas fuel system for an automobile is illustrated in FIG. 1. In this typical system, compressed natural gas storage cylinders reside in the trunk, taking up valuable cargo space, and numerous safety devices are redundantly incorporated throughout the fuel delivery system to insure that each tank has adequate safeguards to meet the applicable regulations. The size and/or number of tanks can be reduced, but this solution results in an unacceptable range limitation. The foregoing and related factors have hampered sales of light-duty natural gas powered vehicles and development of the industry.

SUMMARY OF THE INVENTION

The present invention utilizes the latest developments in materials and manufacturing processes to produce a compressed gas fuel storage system that avoids the limitations of current gas storage systems discussed above. The materials and processes used enable mass production of the fuel storage system, significantly reducing its initial cost. Of critical importance, the invention includes the design of a lightweight, high strength storage system that meets or exceeds the safety requirements and application standards dictated by applicable governmental and industrial standards.

The compressed gas fuel storage system of the invention includes a plurality of composite over-wrapped cylinders (pressure cells), a unitizing, high strength outer shell with internal protective material (i.e. foam or honeycomb) for the pressure cells, a central gas control assembly with interconnecting gas lines, a sealed, but removable for service, protective cover for the gas control assembly, and straps to secure the system to the vehicle.

The outer shell is an unstressed (un-pressurized), fire-resistant structure that serves the purpose of unitizing the plurality of pressure cells into a single container capable of withstanding physical abuse associated with motor vehicle applications. The outer shell and impact-absorbing material (i.e. foam or honeycomb) contained therein serve to protect the pressure cells from impact loads. The gas control assembly protective cover and impact-absorbing material such as, but not limited to, foam or honeycomb contained therein serving to protect the gas control assembly from impact loads. The outer shell and the gas control assembly protective cover are fabricated from an impact-resistant, fiber-reinforced thermoplastic or thermoset plastic material. The outer shell, in conjunction with elastomeric gaskets and grommets, also serves to protect the pressure cells from exposure to water, road salt, automotive fluids (i.e. gasoline, motor oil, battery acid, antifreeze, brake fluid, etc.), and sunlight.

Only a single gas control assembly is needed to meet all safety standards because the plurality of pressure cells has been unitized into a single container. This gas control assembly includes a thermally activated pressure relief device, a manual service shut-off valve, an electric solenoid valve, and a port to connect the fuel storage system to the vehicle engine and the refueling adapter.

The compressed gas fuel storage system of the invention is designed to be attached to the vehicle with straps, tabs, or brackets which do not alter the structural compliance of the vehicle chassis in the event of a rear end collision. This is critical in light-duty vehicles which are designed to protect the passengers by absorbing collision energy through deformation of the chassis in non-passenger compartment regions of the vehicle (i.e. trunk and engine compartment regions).

Therefore, it is a primary objective of the present invention to provide a compressed gas fuel storage system for vehicles that is shaped in a near-rectangular or other non-cylindrical configuration to accommodate available chassis space and vehicle packaging constraints.

Another objective of the invention is to provide a compressed gas vehicle fuel storage system utilizing a single gas control assembly, including a thermally activated pressure relief device, a manual service shut-off valve, an electric solenoid valve, a port to connect the fuel system to a vehicle engine and refueling adapter, and a plurality of pressure cells contained within a molded housing.

A further objective of the present invention is to provide a compressed gas vehicle fuel storage system, which incorporates cylindrical pressure cells with near-hemispherical shaped domed ends.

A further objective of the present invention is to provide a compressed gas vehicle fuel storage system incorporating a plurality of pressure cells contained within a molded housing incorporating strengthening webs strategically placed between the pressure cells.

A still further objective of the invention is to provide a molded container for a plurality of pressure cells which is assembled by snap lock or other means holding individually molded container segments together.

Another objective of the invention is to provide a molded gas control assembly protective cover for a compressed gas vehicle fuel system.

A further objective of the invention is to provide means to maintain ambient atmospheric pressure within a molded container which functions as a protective housing for a plurality of pressure cells.

A still further objective of the present invention is to provide mounting means for a plurality of pressure cells within a protective container that allows expansion and contraction of the fuel cells during the course of normal pressurization and depressurization operations without stressing the container.

A still further objective of the present invention is to provide means for isolating individual ones of a plurality of pressure cells within a protective container to enable said container to undergo penetration with a high-speed projectile without causing catastrophic rupture of the container, but allowing the gas to vent in a controlled manner. A still further objective of the present invention is to provide a means of attaching a compressed gas vehicle fuel storage system to a vehicle by means of straps, tabs, or brackets for keeping said system fixed to the chassis under normal driving conditions but allowing the system to be displaced relative to the chassis in the event of a chassis crushing, high-speed collision.

Another primary objective of the present invention is to provide a compressed gas vehicle fuel storage system, which meets or exceeds government and industrial standards.

An objective of the present invention is to provide a compressed gas vehicle fuel storage system which meets or exceeds the standards developed by the National Fire Protection Association for compressed natural gas vehicle fuel systems as published in ANSI/NFPA 52, Compressed Natural Gas (CNG) Vehicular Fuel Systems, 1995, published by the American National Standards Institute and National Fire Protection Association and incorporated herein by reference.

Another objective of the invention is to provide a compressed gas vehicle fuel storage system which meets or exceeds the standards and revisions thereto developed by the Natural Gas Vehicle Coalition and published in the American National Standard for Basic Requirements for Compressed Natural Gas Vehicle (NGV) Fuel Containers, ANSI/IAS NGV2-1998, and incorporated herein by reference.

A still further objective of the invention is to provide a compressed gas vehicle fuel storage system which meets or exceeds the standards and revisions thereto developed by the Natural Gas Vehicle Coalition and published in the American National Standard for Pressure Relief Devices for Natural Gas Vehicle (NGV) Fuel Containers, ANSI/IAS PRD 1-1998., and incorporated herein by reference.

Another objective of the invention is to provide a compressed gas vehicle fuel storage system which meets or exceeds the standards developed by the National Highway Traffic Safety Administration (NHTSA) of the Department of Transportation (DOT) and published by the National Highway Traffic Safety Administration as Federal Motor Vehicles Safety Standard, Standard No. 303, Fuel System Integrity of Compressed Natural Gas Vehicles, 1994, and incorporated herein by reference.

A further objective of the present invention is to provide a compressed gas vehicle fuel storage system which meets or exceeds the standards developed by the National Highway Traffic Safety Administration (NHTSA) of the Department of Transportation (DOT) and published by the National Highway Traffic Safety Administration as Federal Motor Vehicles Safety Standard, Standard 304, Compressed Natural Gas Fuel Containers.

BRIEF DESCRIPTION OF THE DRAWINGS

FIG. 9 is a perspective view of the gas control assembly including the distribution manifold, pressure cell connectors and related tubing.

DETAILED DESCRIPTION OF THE INVENTION

Figure 1:
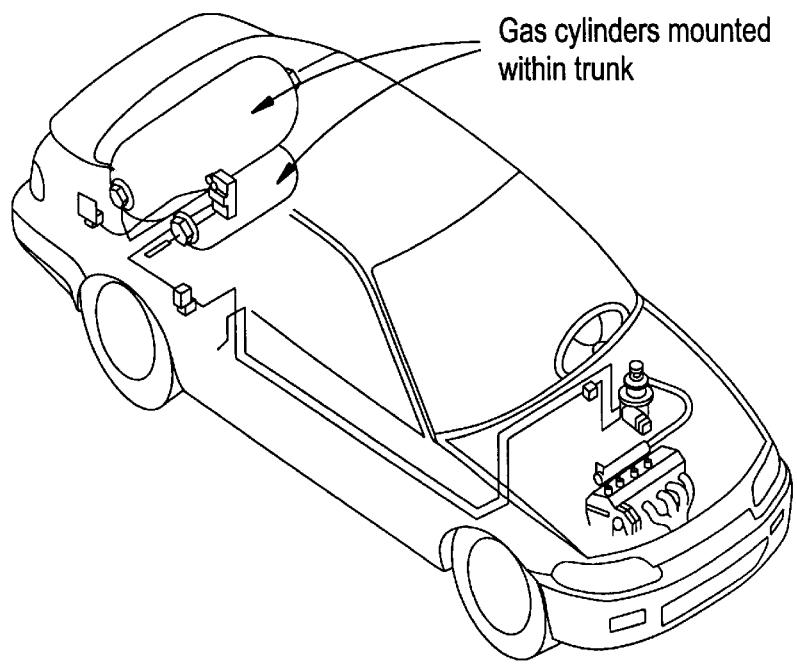
FIG. 1 depicts a typical prior art compressed natural gas fuel system installed in a vehicle.
Figure 2:
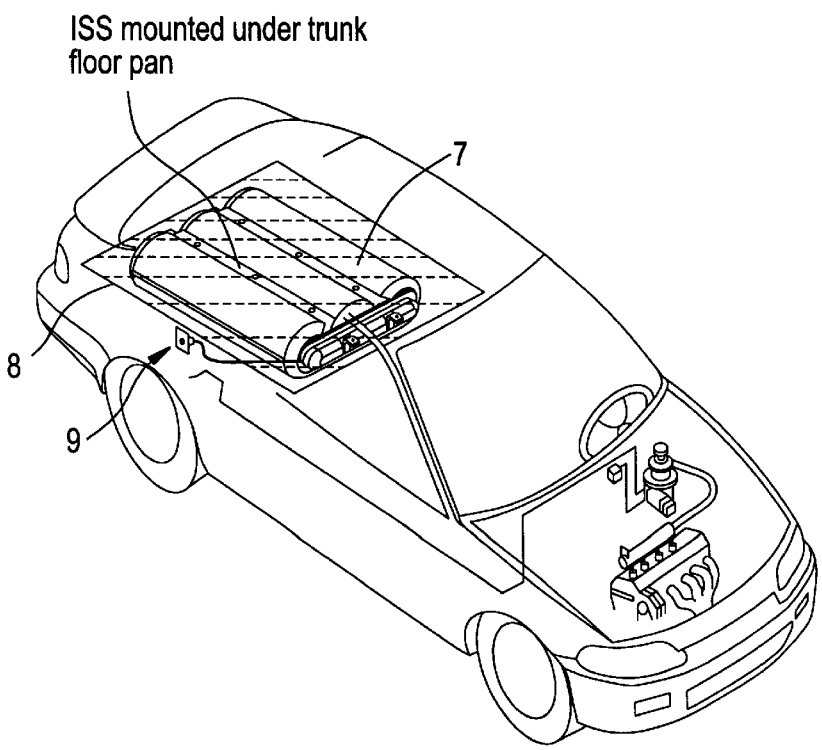
FIG. 2 illustrates an installation of the present invention in a light-duty vehicle.

The anticipated primary application of the present invention is a fuel storage container for automobiles, vans, and light, medium, and heavy duty trucks. Therefore, the preferred embodiment is presented in terms of an assembly, which fits in available chassis space and is installed in a manner similar to a conventional gasoline fuel tank. FIG. 2 illustrates a preferred embodiment, which is dimensioned and configured to be located within or beneath the vehicle. Comparing the prior art compressed gas fuel storage system of FIG. 1 with the integrated system of the current invention illustrated in FIG. 2, demonstrates that the integrated approach conserves cargo space. It allows the compressed gas integrated storage system, 7, to be installed under the chassis, 8, of a vehicle, with a refueling port, 9, in the same location as a gasoline fill port.

The invention, hereinafter referred to as the system, or ISS for integrated storage system, is designed to be used with compressed gases such as hydrogen, natural gas, natural gas/hydrogen mixtures, or any other gas, which is stored at high pressure and may be used as a fuel source in a vehicle. However, to simplify the presentation, the preferred embodiment of the invention is described in terms of a compressed natural gas (CNG) fuel storage system with an service pressures of up to 4500 psig.

Figure 3:
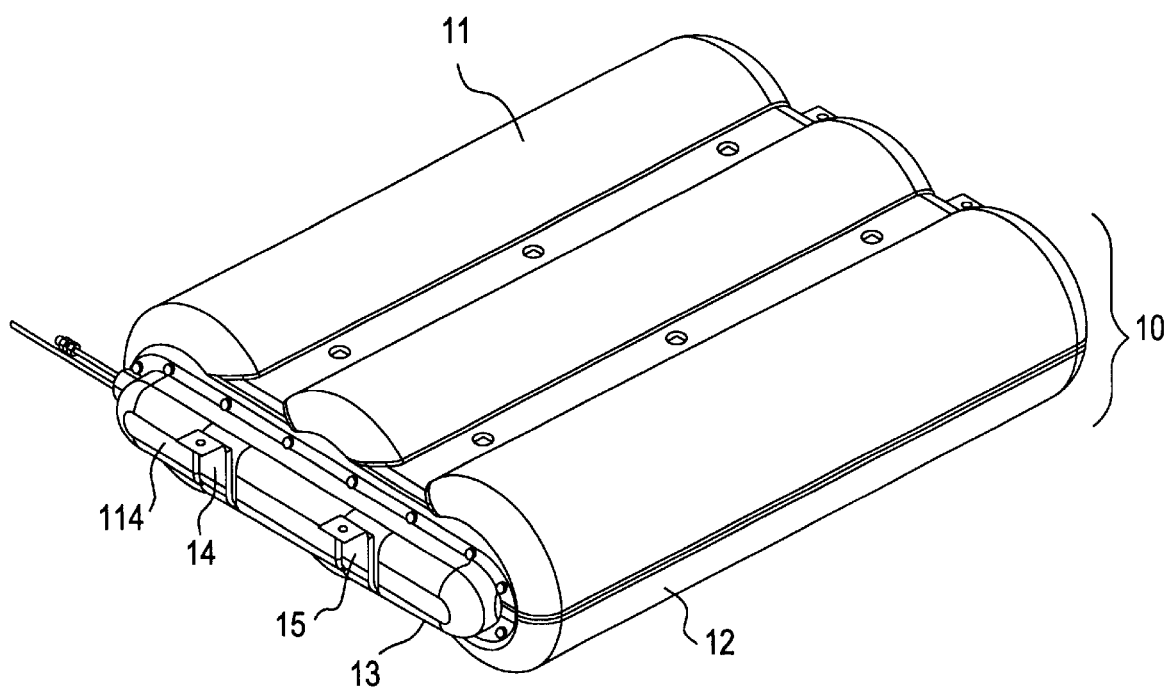
FIG. 3 is a perspective three-quarter view of the integrated compressed gas vehicle fuel storage system, comprising the invention, assembled and ready for installation in a vehicle.
Figure 4:
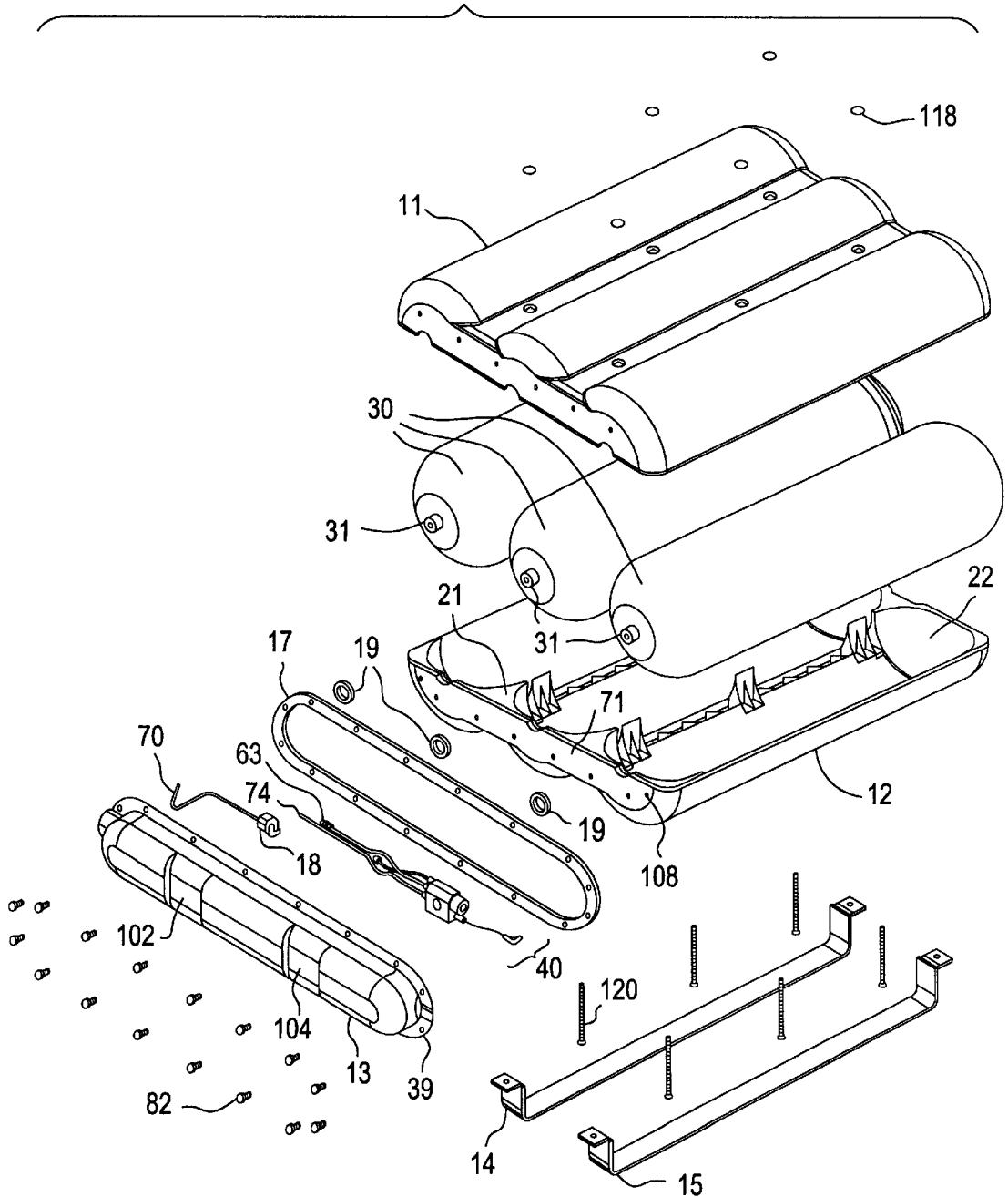
FIG. 4 is an exploded view of the invention.

The system is illustrated in FIG. 2 as it is typically installed in an automobile. It embodies the concepts of pressure containment, damage tolerance, and gas control. Referring now to FIGS. 3 and 4, these concepts are achieved by a plurality of compressed gas pressure cells 30 of the type incorporating cylindrical bodies with domed ends, contained within a protective, unstressed outer shell 10 comprised of the upper and lower shell sections, 11, 12, and a gas control assembly, 40, with a gas control assembly protective cover, 13.

The outer shell 10 is a high strength, semi-rectangular box of molded, impact and fire-resistant plastic material, dimensioned to conform to the shape of the pressure cells. The shell is designed and manufactured to unitize the plurality of pressure cells into a single container that remains structurally intact under a variety of environmental conditions, abuses associated with mishandling in shipment and installation, and impacts from road debris and vehicle collision as required by FMVSS 303, 304, and ANSI/IAS NGV2-1998. The outer shell assists in allowing the ISS to meet or exceed all requirements of FMVSS 304 and ANSI/IAS NGV2-1998 for tests, which include pressure cycling, bonfire, flaw tolerance, drop, pendulum impact and gunfire. The shell achieves its strength through the selection of its materials, its internal stiffeners located in the valley spaces between the pressure cells, and by means of its final assembly.

Figure 5A:
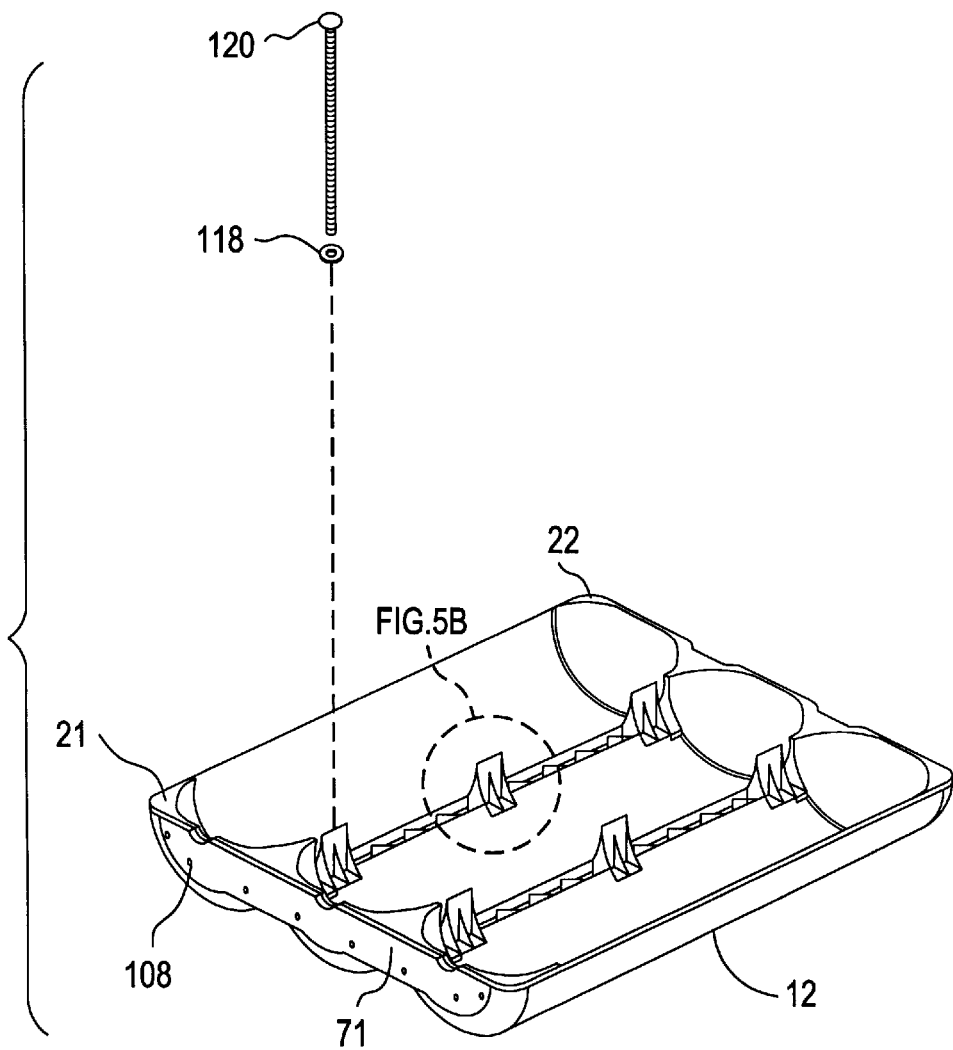
FIG. 5 is a perspective three-quarter view of one of the half-sections of the integrated storage system (ISS) pressure cell housing illustrating the reinforcing webs and pillars and one of the devices used to secure two halves together.
Figure 5B:
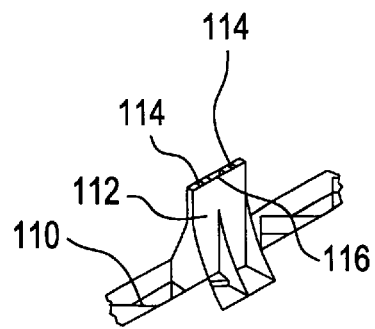
Figure 6A:
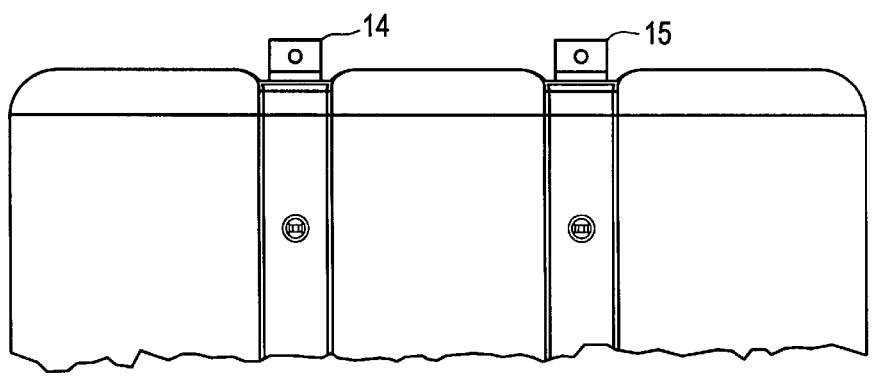
FIG. 6 is a montage of, from the top of the figure to the bottom, a plan view of the end of the ISS opposite the gas control assembly, as viewed from the bottom, a plan cut-away view of the ISS taken along the line A—A of FIG. 3 as it is installed on the undercarriage of a vehicle, and a plan view of the gas control assembly end of the ISS as viewed from the top.
Figure 6B:
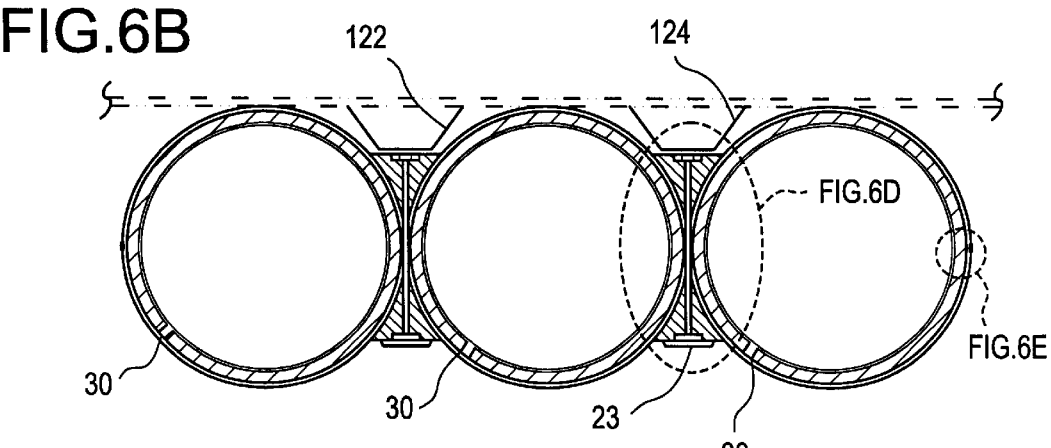
Figure 6C:
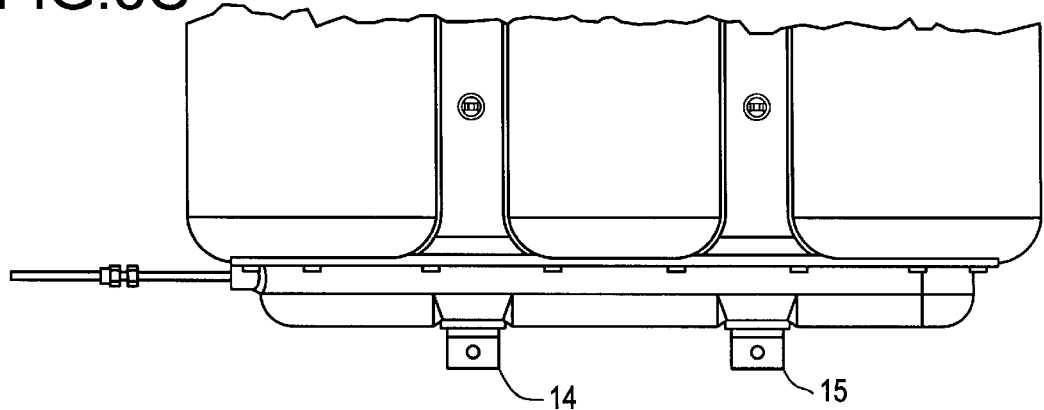
Figure 6D:
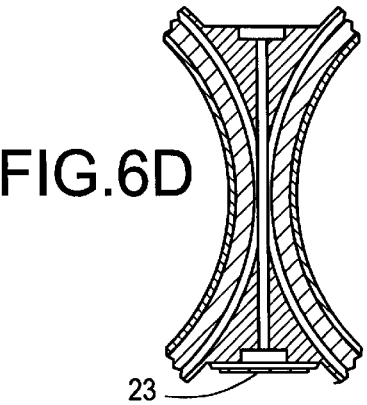
Figure 6E:
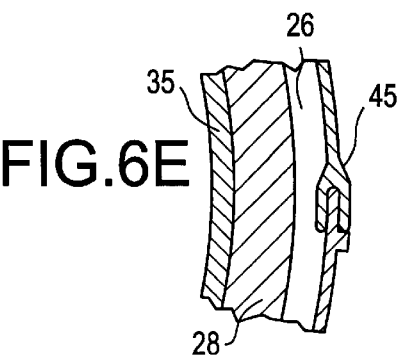

Threaded fasteners, 108 (FIG. 5), are located at the forward end of the upper and lower outer shell sections 11, 12 of the outer shell 10 to allow the gas control assembly protective cover 13 to be fastened to the assembled upper, 11, and lower, 12, outer shell sections with mounting screws, 82 (FIG. 4). In the preferred embodiment, metallic threaded inserts are molded in-place or installed into the forward surface of the upper and lower shell sections at the locations of the gas control assembly protective cover mounting screws 82.

In this embodiment, the valley spaces between the pressure cells incorporate a longitudinal stiffener consisting of a ribbed section, 110 (FIG. 5), integrally molded into the shell in the valley areas for the full length of the shell. The recessed surfaces formed by the bridge between the radiuses that meet in each valley provide a mounting location that allows all mounting devices to fit completely within the external envelope of the ISS. A pair of external mounting straps, 14, 15, work in conjunction with channel-shaped sections, 122, 124 (FIG. 6), attached to the vehicle to attach the unit to the chassis. These mounting components fit into the longitudinal valley spaces in the upper 11 and lower 12 shell sections of the outer shell 10, providing a means of attaching the ISS to the vehicle and keeping it in position under normal driving conditions, but allowing it to move relative to the chassis in the event of a high-speed rear end collision.

The configuration of the various components that form the integrated fuel storage system are illustrated by the exploded view of FIG. 4. In the preferred embodiment, the joint between the upper and lower shells consists of a tongue and groove, 45 as illustrated in FIG. 6, molded into the perimeter of the shells which are designed to fit together with an interference or snap-fit with or without an adhesive sealant. In addition, several pillars, 112 (FIG. 5), are molded into the valley areas of the upper and lower shells. When the shells are assembled together, configured details 114 on the mating surfaces of the pillars nest together and fasteners, such as tie down cables, 120, and strap locks, 118, are installed through each pillar, putting the pillars in compression and holding the upper 11 and lower 12 sections together. Joining the pillars in such a manner serves to increase the overall structural stiffness of the housing, while maintaining the thin-wall nature of the shell.

The ISS outer shell 10 has interior dimensions that permit the installation of shock absorbing, protective bumpers, 21, 22 (FIG. 5), surrounding and protecting the dome regions of the pressure cells 30. The gas control assembly protective cover, 13, has interior dimensions that permit the installation of shock absorbing, protective bumpers, 78, 80 (FIG. 7), surrounding and protecting the gas control assembly 40.

Figure 8:
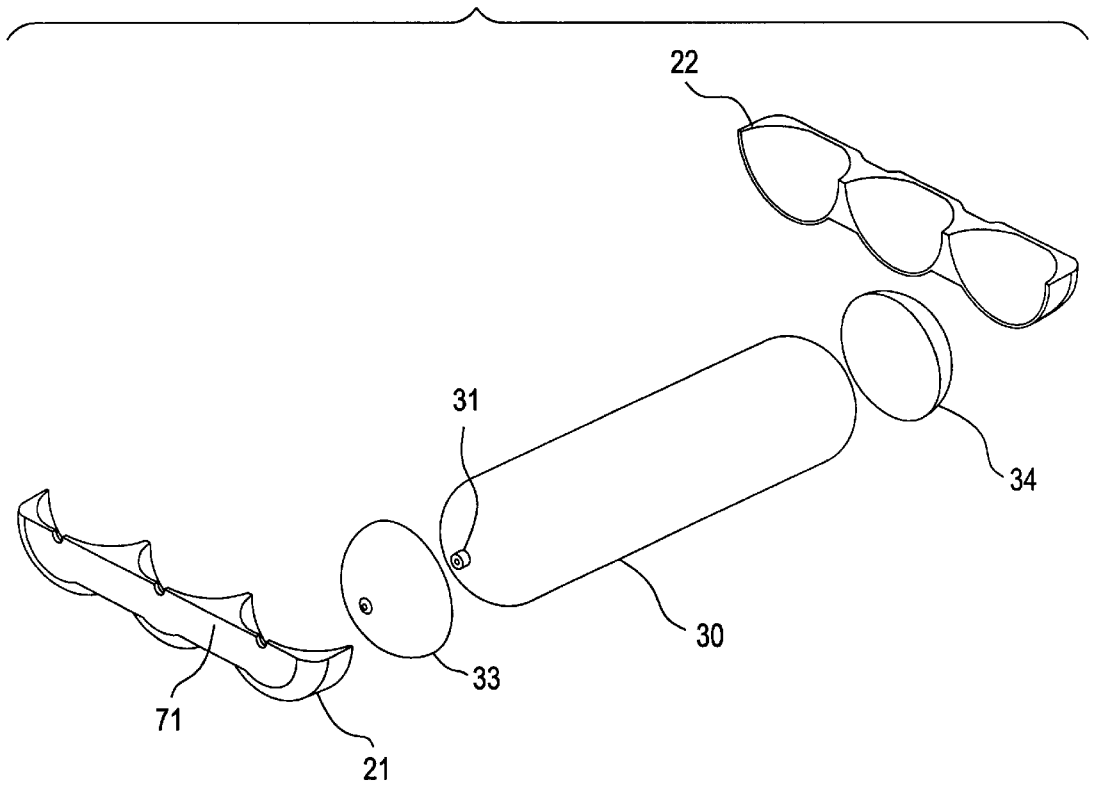
FIG. 8 is a perspective, three-quarter exploded view illustrating the lower shell section of the ISS container/outer shell, one of the pressure cells used by the system, and the bumpers and elastomeric caps that support and cushion the pressure cells.
Figure 8:
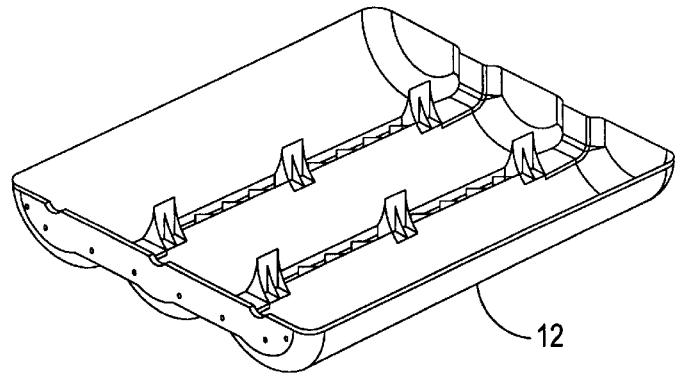

The protective bumpers 21, 22 are fabricated to the shape of the interior of the top 11 and bottom 12 shell sections and to conform to the shape of the pressure cell dome areas. These shock-absorbing bumpers act as protective supports for the domes of the pressure cells. The pressure cells are bound to the structure in the region of the domes only, through elastomeric interface caps 33, 34 (FIG. 8), consisting of rubber- or sponge-like material, and attached to both the pressure cells and the impact absorbing bumpers with an elastomeric adhesive. The cylindrical portions of each pressure cell do not make physical contact with each other or with the outer shell. This results in a radial air gap, 26 (FIG. 6), surrounding the cylindrical region of pressure cells which physically de-couples the pressure cells from each other. The air gap 26 and the elastomeric interface caps 33, 34 in the dome regions accommodate the dimensional growth of the pressure cells during pressurization caused by normal filling of the pressure cells.

In the preferred embodiment, isolation is achieved through the relative dimensions of pressure cells and the outer shell combined with the elastomeric interface caps, 33, 34, and shock absorbing, protective bumpers, 21, 22, which position the pressure cells within the outer shell and absorb the effects of lengthening of pressure cells during expansion. This relative positioning creates the radial air gap, 26, around each pressure cell, which absorbs the radial expansion of the cell. During storage system filling, pressure induced expansion of pressure cells, is both radial and longitudinal. In alternate embodiments, the air gap, 26, may be replaced by a low density foam or similar material which will compress without applying significant pressure to the interior of the pressure cell container or adjacent pressure cells.

Each pressure cell includes an inlet/outlet port, 31 (FIGS. 4 and 8), consisting of a through hole with threads machined into the end of a metal boss which extends through openings in the shell. Rubber seals/grommets, 19, surrounding the exposed metal bosses of each pressure cell also allow growth in the length direction during pressurization without applying stress to the outer shell and are used to locate the pressure cells in the outer shell. The grommets also act as a seal, preventing water or other debris from collecting within the outer shell air gap, 26.

The system includes an internal vent, best seen in FIG. 4, consisting of a hole, 71, through the outer shell, 10, in the area under the protective cover, 13, and a small atmospheric vent tube, 70, which together allow the air gap around the pressure cells and within the pressure cell container to remain at local atmospheric pressure, allowing the outer shell, 10, to remain in an unstressed state. The atmospheric vent tube, 70, under the protective cover, 13, keeps the space under the protective cover at ambient atmospheric pressure.

An elastomeric gasket, 17, provides a seal between the outer shell, 10, and the gas control assembly protective cover, 13. An elastomeric seal/plug, 18, supports and seals the passage of the thermally activated pressure relief device (PRD) safety vent tube, 74, gas supply tube, 63, distribution manifold solenoid external power wires, 75 (FIG. 9), and the atmospheric vent tube, 70.

Figure 7:
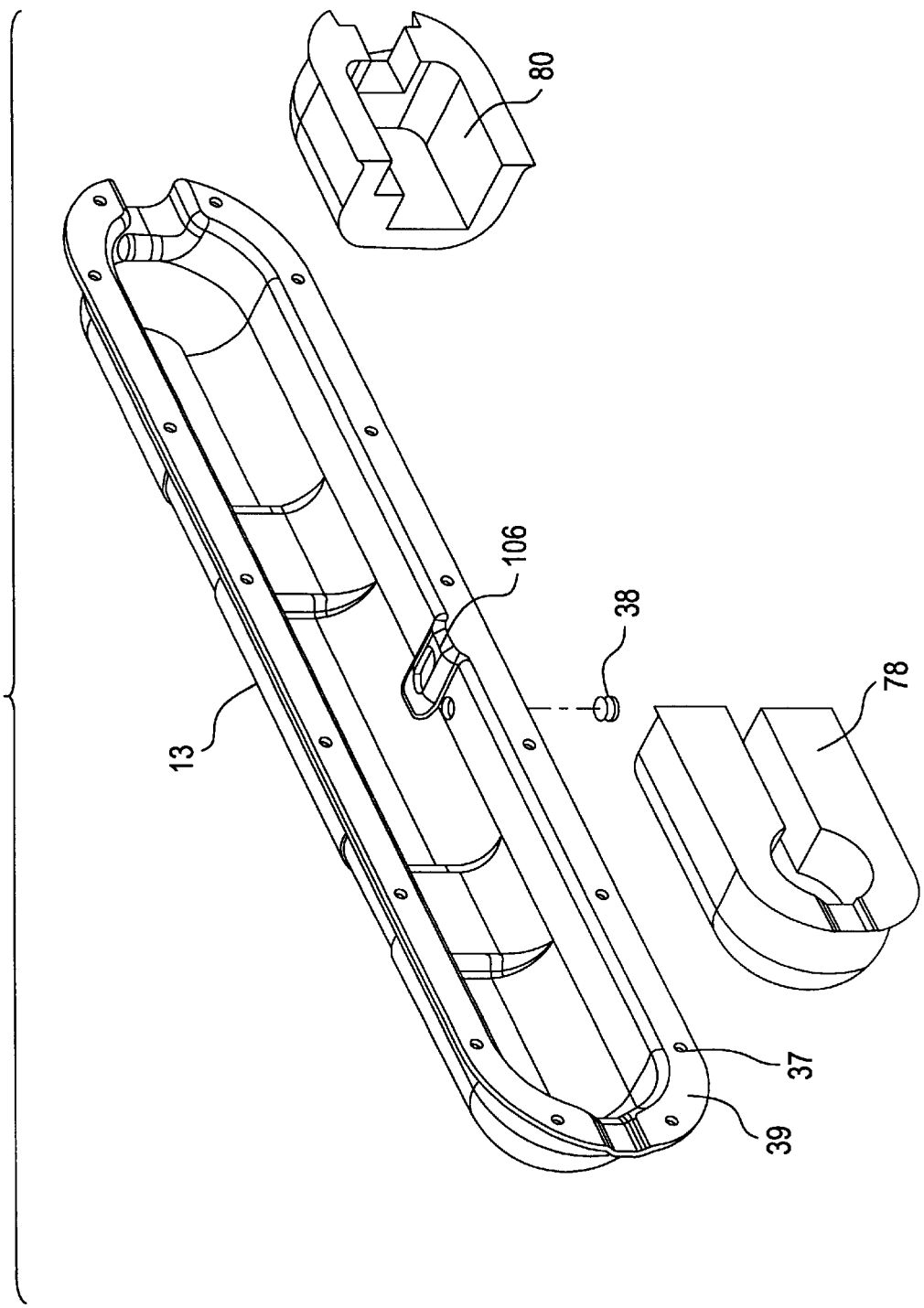
FIG. 7 is an exploded, three-quarter perspective view illustrating the interior of the gas control assembly protective cover and protective bumpers.

The gas control assembly protective cover design allows for ease of servicing of the gas control unit while capturing and venting the flow of any gas leaks. As shown in FIGS. 4 and 7, the protective cover, 13, includes a flange, 39, with bolt holes, 37, that provides a sealing surface for the gasket, 17, and an area to install mounting screws, 82, which serve as the structural connection to the outer shell, 10, and provide the clamping force for the gasket, 17. The protective cover 13 includes recesses, 102, 104, in its exterior surface, which are dimensioned and located to accommodate the ISS mounting straps, 14 and 15. The protective cover, 13, also includes a gasketed, recessed window, 106, best seen in FIG. 7, to allow the PRD, 88, (FIG. 9) to be thermally exposed to the heat of a fire. The protective cover also includes an access hole with a removable elastomeric sealing plug, 38, to provide access for the manual shut-off. The protective cover has a flat outer surface, 114 of FIG. 3, parallel to the forward surface of the outer shell, to minimize the localized stresses due to impact, such as encountered during the 6 foot drop test required by ANSI/IAS NGV2-1998. Two shock absorbing, protective bumpers, 78, 80, of FIG. 7, are installed into the ends of the interior of the gas control assembly protective cover, 13, surrounding and protecting the gas control assembly.

The pressure cells, 30, used in the invention are a variant of commercial compressed natural gas vehicle storage cylinders of Type 3 or 4 construction in accordance with the specifications set forth in ANSI/IAS NGV-2 and are manufactured by Lincoln Composites, Lincoln, Neb. as part No. R 240049-001. Type 3 composite full-wrapped cylinders consist of a metal liner with continuous filaments of reinforcement fibers in a resin matrix filament wound over the liner. The cylinders are designed such that partial load sharing takes place between the metal liner and the composite overwrap. Type 4 all-composite cylinders, illustrated in cross-section by FIG. 6, have a gas-tight, non-load bearing plastic liner, 35, overwrapped with continuous filaments of reinforcement fibers in a resin matrix, 28. The cylinders are designed such that the composite overwrap takes all the load. Cylindrical pressure cells with near-hemispherical domed ends are used since they are the most efficient and cost effective means of carrying gas under high pressure. This is due to the fact that a pressure vessel with a circular cross section has uniform hoop stresses. A pressure vessel with a non-circular cross section would have higher peak hoop stresses, as well as local bending stresses, which would in turn require a thicker wall and therefore result in a heavier, more expensive pressure cell.

In the preferred embodiment, the pressure cells, 30, (FIG. 6), are of Type 4 design consisting of a hybrid of carbon and E-glass fibers with epoxy resin filament wound over thermoplastic (i.e. HDPE or other suitable plastic) liner which is molded with a boss of aluminum, steel or composite at each end or at the inlet/outlet port end only. They are similar to a commercial product in the Type 4 category except that they do not have additional overwraps, coatings, or any other means to afford protection from impact or environmental exposure, since this function is performed by other components of the ISS, namely the energy absorbing bumpers and the outer shell, 10. Also, the pressure cells have a closed boss at the aft end, which is flush with the dome surface. The pressure cells meet or exceed all requirements of FMVSS 304 and ANSI/IAS NGV2-1998 for tests, which include burst, pressure cycling, high temperature creep, stress rupture, and gas permeation. Other pressure cell designs may be incorporated in additional embodiments of the ISS. This could include pressure cells similar to those described above but with an all-carbon overwrap or other type of thermoplastic liner.

The materials for the outer shell, 10, and the gas control assembly protective cover, 13, are selected to protect the pressure cells from the types of environmental exposure required by FMVSS 304 and ANSI/IAS NGV2-1998. In the preferred embodiment, the upper, 11, and lower, 12, shell sections of the outer shell, 10, and the gas control assembly protective cover, 13, are fabricated from an impact-resistant, fiber reinforced thermoplastic or thermoset plastic material, such as GE Plastics XENOY®, using the injection molding, compression molding, or reaction injection molding technique. Alternate materials and fabrication processes could be used to form the shell sections and the protective cover. The gas control assembly protective cover, 13, is completed by bonding or molding in-place energy-absorbing protective bumpers into the end areas. The energy-absorbing bumpers are fabricated from an impact-absorbing material such as, but not limited to, foam or honeycomb.

As shown in FIG. 9, the gas control assembly, 40, is comprised of a gas distribution manifold, 41, which, in the preferred embodiment, is a machined or cast and turned metal block that interconnects all of the pressure cells of the ISS, pressure cell pneumatic connection line assemblies, 61, 62, a safety vent tube, 74, and a supply tube 63. The gas distribution manifold, 41, incorporates a solenoid valve, 51, which is controlled by the vehicle electrical system and controls a pneumatic passage between the supply line and pressure cells via the pressure cell pneumatic connection line assemblies, 61, 62, and pneumatic connecting bolt, 42.

The distribution manifold, 41, is connected to the inlet/outlet port, 31, of the center pressure cell. This connection is accomplished by pneumatic connecting bolt, 42, which physically secures the manifold to the pressure cell assembly and provides a pneumatic passage to one of the pressure cells. The manifold, 41, contains a gas passage to ports which are connected via conventional hi-pressure fittings and stainless steel tubing forming the pressure cell pneumatic connection line assemblies, 61, 62, to the inlet/outlet ports, 31, of the other pressure cells. Thus, all three pressure cells are pneumatically interconnected by the manifold, 41.

The manifold, 41, is also connected to the supply tube, 63, through a manual shut-off valve, 55, and the solenoid valve, 51. The shut-off valve is comprised of a valve seat, associated bore and the shut-off valve stem, which is threaded into the shut-off valve bore. The manual shut-off valve provides a means to stop gas flow from the ISS into the vehicle fuel system via the solenoid valve, 51, and supply tube, 63. The supply tube, 63, is coupled to the vehicle refueling port and the engine fuel supply by conventional high-pressure fittings and stainless steel tubing.

The distribution manifold, 41, incorporates a thermally responsive pressure relief device PRD). The PRD is pneumatically coupled to the manifold. The PRD opens to vent the gas at a controlled rate through the safety vent tube, 74, in the event of a vehicle fire involving the fuel storage area. The PRD is activated as a result of exposure to the heat of flame.

In the preferred embodiment, the pressure cells and their protective housing are assembled through the following steps. The molded protective bumpers, 21, 22, are adhesive bonded to the outer shell upper and lower sections, 11, 12. The elastomeric interface caps, 33, 34, are bonded to the dome ends of the three pressure cells with an adhesive/sealant. Adhesive is applied to the outside surfaces of the elastomeric interface caps, 33, 34, on each of the three pressure cells. Rubber seals/grommets, 19, are placed around the pressure cell exposed metal bosses. The pressure cells are placed within the lower shell section, 12, locating the rubber seals/grommets in the slots in the edges of the forward ends of the lower shell section, 12. The upper shell section, 11, is installed over the lower section. An adhesive sealant may be applied to the perimeter joint area between the shell sections. Sufficient force is applied to the shell sections to fully seat the interference or snap-fit joint. As the adhesive/sealant cures, the assembly is secured by a plurality of mechanical fasteners, 118, 120, such as nylon tie-downs, installed through holes, 11 6, in the pillars, 112, located in the valleys of the upper and lower halves.

The assembly procedure continues with attaching the gas control assembly, 40, to the inlet/outlet ports, 31, in the metal bosses of the pressure cells. An elastomeric gasket, 17, is positioned between the gas control assembly protective cover, 13, and the assembled pressure cell container, 10. Next, the gas control assembly protective cover, 13, is attached over the gasket, 17, to the outer shell, 10, with a plurality of bolts, which are threaded into the inserts in the upper and lower sections of the outer shell. This encloses the gas control assembly.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. An integrated compressed gas vehicle fuel storage system, comprising:
    a plurality of compressed gas pressure cells of the type incorporating domed ends and cylindrical bodies;
    a container for said plurality of compressed gas pressure cells, wherein said container is comprised of mirror image top and bottom halves configured to conform to the shape of said plurality of compressed gas pressure cells;
    means for securing said plurality of compressed gas pressure cells within said container and for isolating said plurality of compressed gas pressure cells from each other and from said container whereby expansion of one of said compressed gas pressure cells will not apply pressure against adjacent compressed gas pressure cells or the inside of said container;
    a gas control assembly pneumatically interconnecting said plurality of compressed gas pressure cells;
    a protective cover for said gas control assembly fastened to said container;
    valleys formed in the interior of said top and bottom halves between adjacent compressed gas pressure cells;
    reinforcing webbing located within said valleys;
    pillars located within said valleys as mirror image pillars in said top and bottom halves and dimensioned to engage their respective mirror image pillar when said top and bottom halves are assembled; and
    a means for securing said system to the vehicle which allows for deformation of the vehicle chassis for protection of the passenger compartment in the event of a high-impact collision.

2. An integrated compressed gas vehicle fuel storage system as defined by claim 1, further comprising:
    snap fit means formed in peripheral mating edges of said top and bottom halves;
    bores formed vertically through said pillars; and
    fastening means fitted through said bores in said mirror image pillars for securing said top and bottom halves together.

3. An integrated compressed gas vehicle fuel storage system as defined by claim 1, further comprising:
    interference fit means formed in peripheral mating edges of said top and bottom halves;
    bores formed vertically through said pillars; and
    fastening means fitted through said bores in said mirror image pillars for securing said top and bottom halves together.

4. An integrated compressed gas vehicle fuel storage system as defined by claim 1, wherein said container and said protective cover are molded from an impact resistant fiber reinforced thermoplastic and said reinforcing webbing and said pillars are molded as part of unitary structures forming said top and bottom halves.

5. An integrated compressed gas vehicle fuel storage system as defined by claim 1, wherein said container and said protective cover are molded from an impact resistant fiber reinforced thermoset plastic and said reinforcing webbing and said pillars are molded as part of unitary structures forming said top and bottom halves.

6. An integrated compressed gas vehicle fuel storage system, comprising:
    a plurality of compressed gas pressure cells of the type incorporating domed ends and cylindrical bodies;
    a container for said plurality of compressed gas pressure cells comprising:
    a molded bottom half;
    a molded top half;
    said top and bottom halves including walls which are opposing when said halves are assembled as said container;
    said opposing walls including a curved section for each one of said plurality of compressed gas cylinders; and
    adjoining edges of said curved sections create valley shaped partitions there between, wherein said valleys shaped partitions comprise reinforcing webs created as part of the molded unitized structure comprising each of said top and bottom halves;
    means for preventing the direct mechanical coupling of said compressed gas pressure cells with each other or said container comprising a radial space about said cylindrical bodies of said compressed gas pressure cells;
    shock absorbing means for positioning and holding said domed ends of said compressed gas pressure cells within said container, said radial space being created by the configuration of said shock absorbing means and the relative dimensions of said container and said compressed gas pressure cells;

a gas control assembly pneumatically interconnecting said plurality of compressed gas pressure cells; and a protective cover for said gas control assembly fastened to said container.

7. An integrated compressed gas vehicle fuel storage system as defined by claim 6, further comprising pillars located within said valleys as mirror image pillars in said top and bottom halves and dimensioned to engage their respective mirror image pillar when said top and bottom halves are assembled.

8. An integrated compressed gas vehicle fuel storage system as defined by claim 7, further comprising:

interlocking means formed in the peripheral mating edges of said top and bottom halves;

bores formed vertically through said pillars; and fastening means fitted through said bores in said mirror image pillars for securing said top and bottom halves together.

9. An integrated compressed gas vehicle fuel storage system as defined by claim 8, wherein said container and said protective cover are molded from an impact resistant fiber reinforced thermoplastic and said reinforcing webbing and said pillars are molded as part of unitary structures forming said top and bottom halves.

10. An integrated compressed gas vehicle fuel storage system as defined by claim 8, wherein said container and said protective cover are molded from an impact resistant fiber reinforced thermoset plastic and said reinforcing webbing and said pillars are molded as part of unitary structures forming said top and bottom halves.

\* \* \* \* \*